March 17, 1942. J. M. LEAKE 2,276,622
BEARING SEAL FOR ROTARY SHAFTS
Filed Sept. 1, 1939
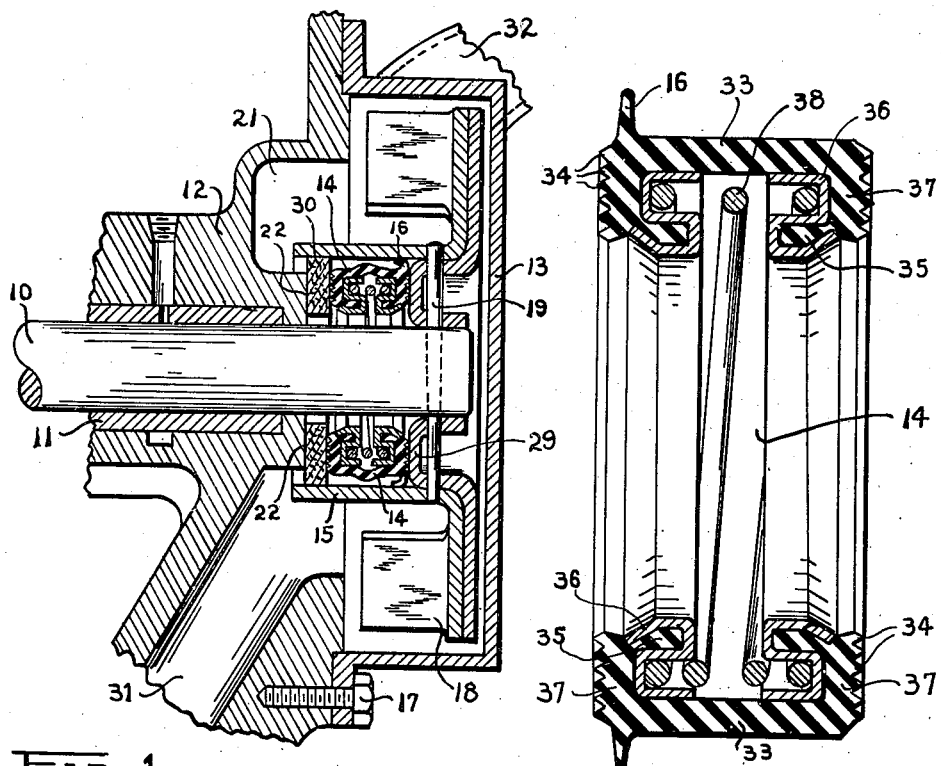
FIG. 1.
FIG. 2.
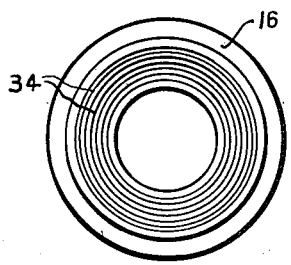
FIG. 4.
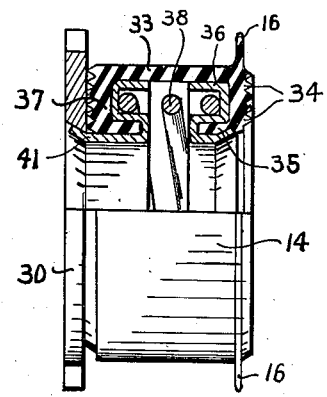
FIG. 6.
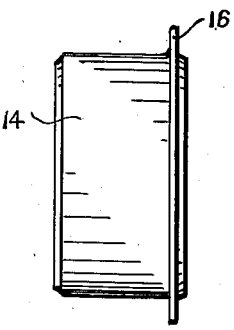
FIG. 3.
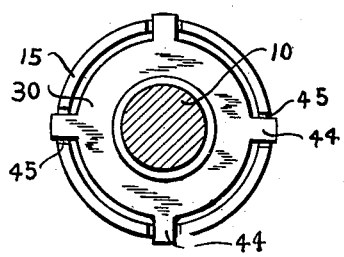
FIG. 5.
Inventor
James M. Leake Patented Mar. 17, 1942

2,276,622

UNITED STATES PATENT OFFICE 2,276,622

BEARING SEAL FOR ROTARY SHAFTS

James M. Leake, Toledo, Ohio

Application September 1, 1939, Serial No. 292,987

5 Claims. (Cl. 288—2)

My invention relates to an improvement in seals, particularly seals for fluid pumps, such as the water pump of an internal combustion engine.

One object of my invention is to provide a flexible sealing unit thus permitting relative longitudinal movement between the shaft and bearing, as well as to compensate for wear in the sealing washer.

Another object of my invention is to provide a sealing unit that does not come in contact with the rotary shaft, thus providing relative longitudinal movement between the shaft and bearing regardless of corrosion or roughness of the shaft. This feature also permits the use of ordinary steel shaft where many of the present types of seals require the use of special shafts that are rust resistant, and in addition an expensive polishing operation.

Another object of my invention is to provide a bearing seal that permits the use of a washer made of carbon, Bakelite or similar material that requires little or no lubrication.

Another object of my invention is to provide a bearing seal for rotary shafts that can easily be replaced.

Another object of my invention is to provide a bearing seal for rotary shafts that is universal, that is it can be used for shafts of different diameters and also in seal housings of different sizes.

Another object of my invention is to provide a bearing seal for rotary shafts that requires the assembling of a minimum number of parts in replacement. This reduces the cost of replacement and also avoids improper assembly by unskilled mechanics.

Another object of my invention is to provide a bearing seal for rotary shafts in which the rubber or flexible part is locked in position when the seal is assembled in position for operation. When rubber comes in contact with warm water or anti-freeze solution in the present type seal the rubber often swells almost double and end sealing faces slides out of position thus destroying the seal. My improved type of bearing seal for rotary shafts is so constructed that the rubber or flexible part is locked in position and can not become dislocated even though it swells and becomes slippery due to the action of warm water or anti-freeze solutions.

Another object of my invention is to provide a bearing seal for rotary shafts that is simple, durable and inexpensive.

With these and other objects in view, my invention consists in the construction, combination and arrangement of the various parts of my improved device as described in the specification, claimed in the claims and illustrated in the accompanying drawing.

In the drawing:

Fig. 1 is a central vertical section through a pump housing showing the impeller and the bearing seal with the shaft shown in elevation.

Fig. 2 is an enlarged sectional view of my flexible sealing unit.

Fig. 3 is a side elevation of my flexible sealing unit.

Fig. 4 is a front elevation of my flexible sealing unit.

Fig. 5 shows the type of sealing washer used in some of the present types of bearing seals.

Fig. 6 is a view in half section in which my flexible sealing unit and the sealing washer are fastened together as one unit.

In Fig. 1 I have shown a drive shaft 10 rotatably mounted in a bearing 11 and supported by a housing 12 of a water pump or other fluid containing device. The end of the pump housing 13 is removable through the medium of the bolts 17. To the shaft 10 is secured an impeller 18 by means of a pin 19.

The flexible bearing seal unit 14, forming the feature of the invention is housed in a cup 15 provided by the impeller 18. The flexible sealing unit is centered in the cup or impeller hub 15 by means of the annular flexible ring 16. The rotary shaft passes through the flexible sealing unit 14 but does not come in contact with the sealing unit. One of the outer ends of the flexible bearing seal 14 bears directly against the bearing portion 29 of the impeller 18 as shown in Fig. 1. The other end of the bearing seal unit 14 bears directly against the face of the sealing washer 30. The other face of the washer 30 in turn bears directly against a smooth annular bearing surface 22 of the housing 12. In operation the shaft 10, the impeller 18, the flexible sealing unit 14 and the washer 30 rotate as one unit. The sealing washer 30 is composed of carbon, Bakelite or any material that will serve this purpose with little or no lubrication. The sealing washer 30 bears directly against the annular bearing surface 22 of the housing 12 and in operation rotates in relation thereto.

The fluid enters through the passageway 31, goes into the annular chamber 21 and leaves the pump by means of the passageway 32. It will readily be seen that with the use of my improved bearing seal for rotary shafts the fluid does not contact the shaft 10. The flexible bearing seal bears against the portion 29 of the impeller and also against the sealing washer 30 thus fluid can not reached the shaft at these points. Since the shaft 10, the impeller 18, the sealing unit 14 and the sealing washer 30 rotate as a unit the parts can not deteriorate because of friction and wear. The smooth face of the sealing washer 30 bearing against the annular surface 22 of the housing 12 forms a seal whether the shaft 10 rotates or not. The small amount of wear that takes place due to the rubbing of the sealing washer 30 on the annular surface 22 is compensated for by the longitudinal expansion of the flexible bearing seal 14.

The foregoing description relates particularly to the type of fluid pumps used in connection with the internal combustion engines, but it can readily be seen where my improved type of seal can be used in connection with any type of fluid pumps or as a bearing seal for other rotary shafts.

Fig. 2 is an enlarged sectional view of the bearing seal 14 and Fig. 4 is an end view of the same. The bearing seal 14 comprises an annular U-shaped rubber or flexible member 33. The outer end faces of the U-shaped rubber or flexible member 33 are provided with a series of annular ridges or ribs 34. These annular ridges greatly aid in obtaining a good seal on either side of the flexible seal 14 as shown in Fig. 1.

A flexible annular flange 16 is formed integral with the annular U-shaped member 33. This flange centers the unit 14 in the housing and readily adapts one sized unit to be used in various sized housings. Fig. 1 clearly shows how the flange 16 centers the flexible bearing seal 14 in the housing or cup 15.

The inner periphery of the legs of the U-shaped body are provided inwardly extending beads 35. Annular stampings 36, conforming to the contour of the inner side of the leg portion 37, extending around the bead 35 and terminating near the outside of the inner periphery of the leg portion 37; are held against the leg portions 37 of the U-shaped member by means of the spring 38. The spring 38 keeps the sealing unit 14 expanded the maximum possible distance at all times. After the unit 14 is assembled the annular stampings are bent so they lock the bead 35 securely in position. Fig. 2 shows the annular stamping 36 bent so as to lock the bead 35 in position.

When my bearing seal is installed it is compressed a small amount. The spring 38 expands the flexible bearing seal 14 to compensate for wear and also provides the pressure for firmly pressing the annular ribs 24 against their respective bearing surfaces thus forming a reliable seal at these points.

When the flexible bearing seal 14 is in operating position, as shown in Fig. 1, the flexible member 33 can not get out of position. My novel flexible bearing seal has a double locking arrangement to keep the flexible member 33 in position. First the bead 35 is locked in position by bending or crimping the annular stampings 36 so as to lock the bead 35 in position as shown in Fig. 2. Next the pressure of the spring 38 upon the leg portion 37 prevents the bead 35 from slipping out of position. One type of flexible seal on the market today has been found to be unsatisfactory because the rubber body portion often works out of the proper position. I have entirely overcome this difficulty by means of the arrangement of the bead 35, the annular stamping 36 and the spring 38.

The construction disclosed in Fig. 6 varies from that shown in Figs. 1 and 2 in that the bearing washer 30 is made a part of the flexible bearing seal unit by extending the annular stamping 41 and flanging it in a chamfered portion of the washer 30 as shown. This construction provides all of the replacement parts of the seal in a single unit. It also eliminates improper installation by unskilled mechanics.

Fig. 5 discloses an end view of the present type of annular cup or impeller hub 15. The sealing washer 30 is provided with lugs 44 that fit in slots 45 cut in the impeller hub 15. This shows how the washer 30 is driven from the impeller 15 through the lugs 44.

With my type of bearing seal it is not necessary to have a shaft composed of rust resisting material or polish the shaft because the shaft 10 does not come in contact with the flexible bearing seal 14 nor the bearing washer 30. Therefore corrosion of the shaft does not effect my seal and furthermore corrosion of the shaft 10 is minimized because my improved seal does not allow the fluid to contact the shaft.

It will readily be seen that my flexible bearing seal is universal. The flexible annular flange 16 provides a means whereby the bearing seal can be centered in housings of various sizes and shapes. It can also be used with a range of shaft sizes because it does not fit closely around the shaft.

My improved rotary shaft bearing seal also permits the use of a simple, durable and inexpensive sealing washer.

While I have described several embodiments of my invention, I do not wish to be limited to the particular forms shown and described as it will be apparent that many modifications therein can be made without departing from the scope of my invention as set forth in the appended claims.

Having thus described my invention what I claim is:

1. A flexible unit for fluid pump seals comprising; an annular flexible channel shaped member with sides extending radially inwardly; annular beads integral with said annular channel shaped member and extending axially inwardly; annular members of S-shaped cross-section on the inner sides of said annular flexible channel shaped member; a compressible spring interposed between said annular members of S-shaped cross section for expanding said annular channel shaped member axially; said annular members of S-shaped cross section serving as an annular channel member for holding said compressible spring in position and the inner portion extending partially around said annular bead for holding said annular bead in position; and a flexible flange integral with and extending radially outwardly from said annular flexible channel shaped member, said flexible flange adapted to center said flexible unit in housings of different sizes.

2. A flexible unit for fluid pump seals comprising; an annular flexible channel member with radially inwardly extending sides; annular beads extending axially inwardly from said radially inwardly extending sides; a spring for expanding said annular flexible channel member; and a plurality of members of S-shaped cross section adjacent the radially inwardly extending sides providing inner and outer channel portions, said outer channel portions adapted to retain the ends of said spring and said inner channel portions extending around said annular beads for holding said bead and preventing the dislocation of said annular flexible channel member.

3. A flexible sealing unit comprising; an annular flexible channel member open inwardly and having radially extending side members provided with a bead extending axially inwardly from the inner periphery of each of said radially extending sides; annular members of S-shaped cross section adjacent the inner sides of said radially extending side members; a spring for expanding said annular flexible channel member axially; each of said annular members of S-shaped cross section providing two channel shaped portions; the outer channel shaped portions providing a means for retaining the ends of said spring and the inner channel shaped portions providing a means for fastening said beads.

4. A flexible unit for fluid pump seals comprising; an annular flexible channel member, said annular flexible channel member comprising an annular band portion provided with disk portions extending radially inwardly from either end of said band portion; an annular bead integral with and extending axially inwardly from the inner periphery of each of said disk portions; an annular stamping adjacent the inner side of each of said disk portions, said annular stampings serving a dual purpose, said annular stampings providing a channel or groove for retaining a spring adapted to expand said annular flexible channel member and providing a means for holding said annular beads in position whereby said annular flexible channel member is prevented from being dislocated.

5. A flexible unit for fluid pump seals comprising; an annular flexible channel member with radially inwardly extending sides; annular beads integral with said radially inwardly extending sides, said annular beads extending axially inwardly from the inner periphery of said radially inwardly extending sides; annular stampings adjacent the inner walls of said radially inwardly extending sides; a spring interposed between said stampings for expanding said annular flexible channel member axially; the outer periphery of said annular stampings providing an annular groove for retaining the ends of said spring, the inner periphery of said annular stampings extending around said annular beads for holding said bead in position whereby the annular flexible channel member is held in position; and an annular flexible flange extending radially from said annular flexible channel member for centering said flexible unit in housings of different sizes.

JAMES M. LEAKE.